United States Patent
Lilliott

(10) Patent No.: US 6,963,643 B1
(45) Date of Patent: Nov. 8, 2005

(54) METHOD AND APPARATUS FOR CANCELING ECHO IN A TELEPHONE COMMUNICATION SYSTEM

(75) Inventor: Neil Lilliott, Godstone (GB)

(73) Assignee: Xilinx, Inc., San Jose, CA (US)

( * ) Notice: Subject to any disclaimer, the term of this patent is extended or adjusted under 35 U.S.C. 154(b) by 319 days.

(21) Appl. No.: 10/173,200

(22) Filed: Jun. 14, 2002

(51) Int. Cl.[7] .............................................. H04M 1/00
(52) U.S. Cl. ..................... 379/406.08; 379/406.06; 379/406.01
(58) Field of Search ...................... 379/406.01, 406.05, 379/406.08

(56) References Cited

U.S. PATENT DOCUMENTS 5,414,766 A * 5/1995 Cannalire et al. ...... 379/406.08

FOREIGN PATENT DOCUMENTS

| DE | 44 18 792 A1 | 11/1995 |
|---|---|---|
| EP | 0 272 714 A1 | 6/1988 |

* cited by examiner

Primary Examiner—Jefferey F. Harold
(74) Attorney, Agent, or Firm—H. C. Chan; John King

(57) ABSTRACT

An algorithm that includes delay elements is used for echo cancellation. The delays allow burst processing of consecutive samples of transmitting and receiving signals in a telephone communication system. As a result, there is tremendous reduction of memory bandwidth when compared to conventional sample-by-sample processing of signals. This algorithm can be advantageously implemented in FPGAs. Echo in over a thousand channels can be cancelled using a FPGA and an external memory device.

20 Claims, 4 Drawing Sheets

METHOD AND APPARATUS FOR CANCELING ECHO IN A TELEPHONE COMMUNICATION SYSTEM

FIELD OF THE INVENTION

The present invention relates to telephone communications, and more specifically to echo cancellation in telephone communication systems.

BACKGROUND OF THE INVENTION

Recently, there are major developments in telephone communications. One example is the tremendous growth in digital cellular telephones. Another example is the use of packet-based data networks, such as those conforming to the Internet Protocol (IP), to carry voice communications (as opposed to using circuit-switched networks). This new technology is called voice-over IP (VoIP). In these applications, voice signals are digitized and travel on digital communication channels. The digital data is processed using digital signal processors (DSPs) and/or field programmable gate arrays (FPGAs). One important task performed by the DSP/FPGA is the elimination of echo.

In telephony applications, "echo" is defined as the reflection of the caller's voice back to the caller through the phone lines. Echo cancellation is the elimination of echo in telephone communications. There are several causes of echo. One cause, called "line" echo, is created when an electrical signal encounters an impedance mismatch at one end of the line, such as that caused by a 2 to 4 wire hybrid in an analog phone system. The echo is exacerbated by distance and by certain kinds of network equipment. Echo delayed by 30 ms or more is generally noticeable to the user, and delays greater than 50 ms affect the quality of the conversation.

SUMMARY OF THE INVENTION

The present invention involves a method for canceling echo in a telephone communication system. A telephone transmits electrical signals to a central station and receives electrical signals from the central stations. The electrical signals are modulated by audio information. The transmitting signals are digitized to generate m+n digitized transmitting data that correspond to a first time period (n and m are predetermined integer numbers and m>=n). The receiving signals are digitized to generate n digitized receiving data that correspond to a second time period. The second time period is shorter than the first time period and has ending time the same as the first time period. A set of n weights data are calculated using the first n digitized transmitting data and the n digitized receiving data. The echo can be cancelled from the receiving signals at a third time period using the set of n weights data. The third time period follows the second time period and has the same length as the second time period.

The above summary of the present invention is not intended to describe each disclosed embodiment of the present invention. The figures and detailed description that follow provide additional example embodiments and aspects of the present invention.

DETAILED DESCRIPTION OF THE INVENTION

The present invention relates to a new method for echo cancellation. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
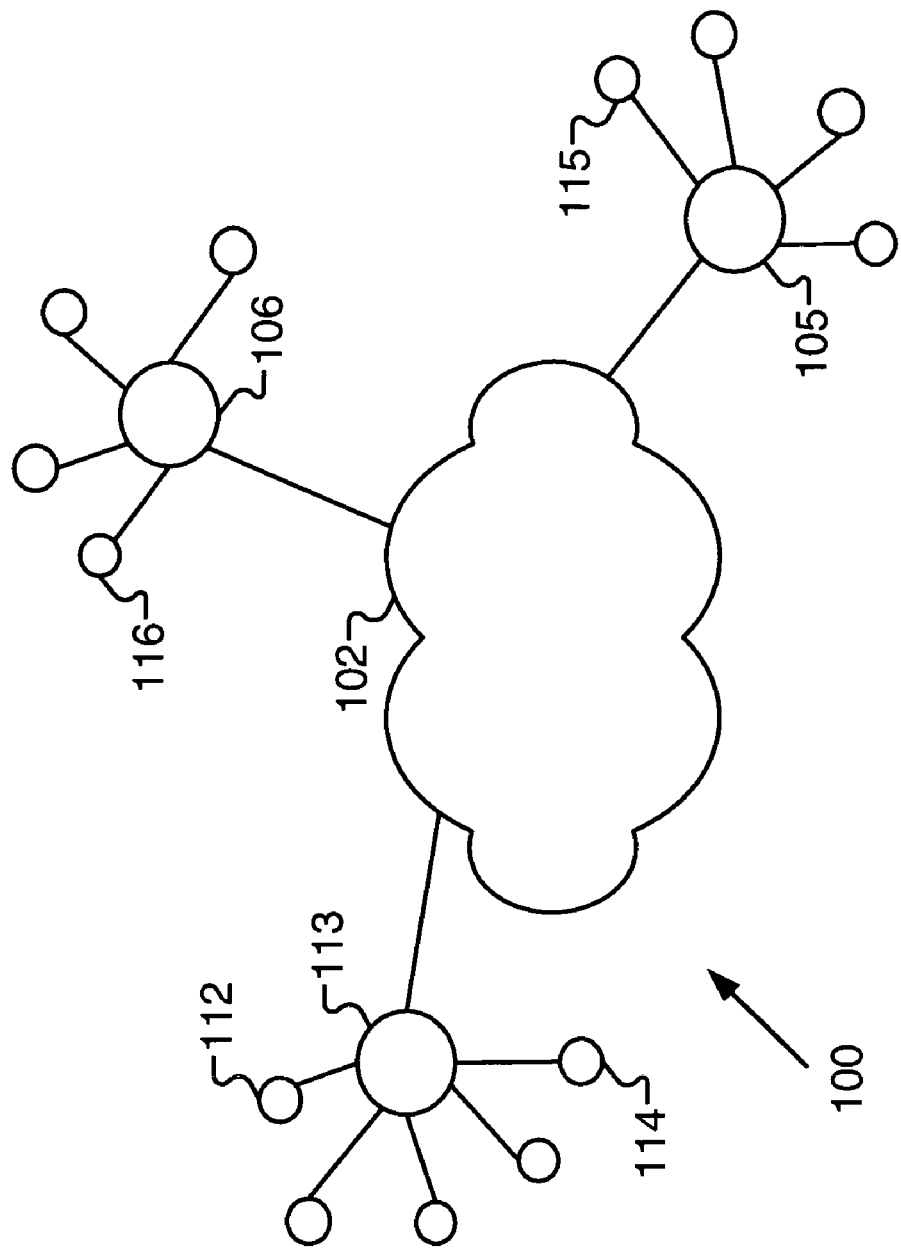
FIG. 1 is a schematic diagram showing a telephone communication system that can use the echo canceller of the present invention.

FIG. 1 is a schematic diagram showing a telephone communication system 100 that can use the echo cancellation apparatus of the present invention. It contains a network "cloud" 102 that provides long distance connection and switching between a plurality of central stations (such as stations 104–106). Each central station can serve hundreds or thousands of subscribers (such as subscribers 112–116).

Figure 2:
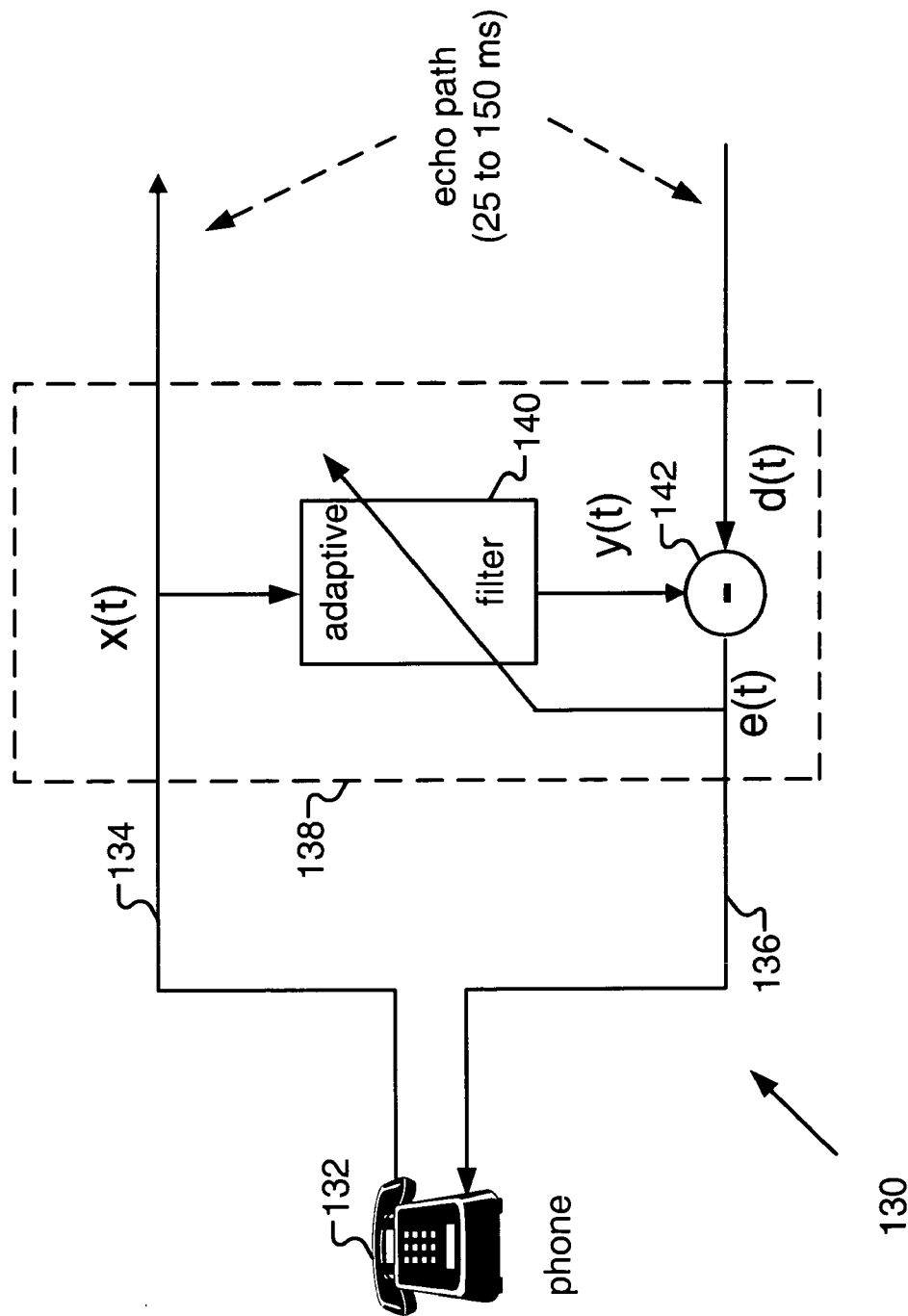
FIG. 2 is a schematic diagram showing a portion of the communication system of FIG. 1.

A portion 130 of communication system 100 is shown in a schematic diagram of FIG. 2. It shows a telephone 132 that sends electrical signals to a central office (not shown) through a line 134 and receives electrical signals from the central office through a line 136. The electrical signals are modulated by audio sources (such as the voice of a caller). Portion 130 also contains an echo canceller 138 that performs echo cancellation operations. Echo canceller 138 contains an adaptive filter 140 and a node 142 that performs subtraction. Adaptive filter 140 models the returning echo, and cancels it by subtracting it from the returned signal.

One way to implement echo canceller 138 is to use digital circuit. The transmitting analog signals (indicated in FIG. 2 by the symbol X(t)) and returning analog signals (indicated in FIG. 2 by the symbol d(t)) are sampled and converted to digital data. Adaptive filter 140 and node 142 are modeled using digital computational means (such as DSPs and FPGAs), and they process digital data representing signals X(t) and d(t).

In the prior art system, the computation is performed on a sample-by-sample basis in real time. One problem with the prior art method is that very large memory bandwidth is required to handle the computation. One aspect of the present invention is to introduce appropriate delays at appropriate points in the signal paths. This has the effect of reducing memory bandwidth.

Figure 3:
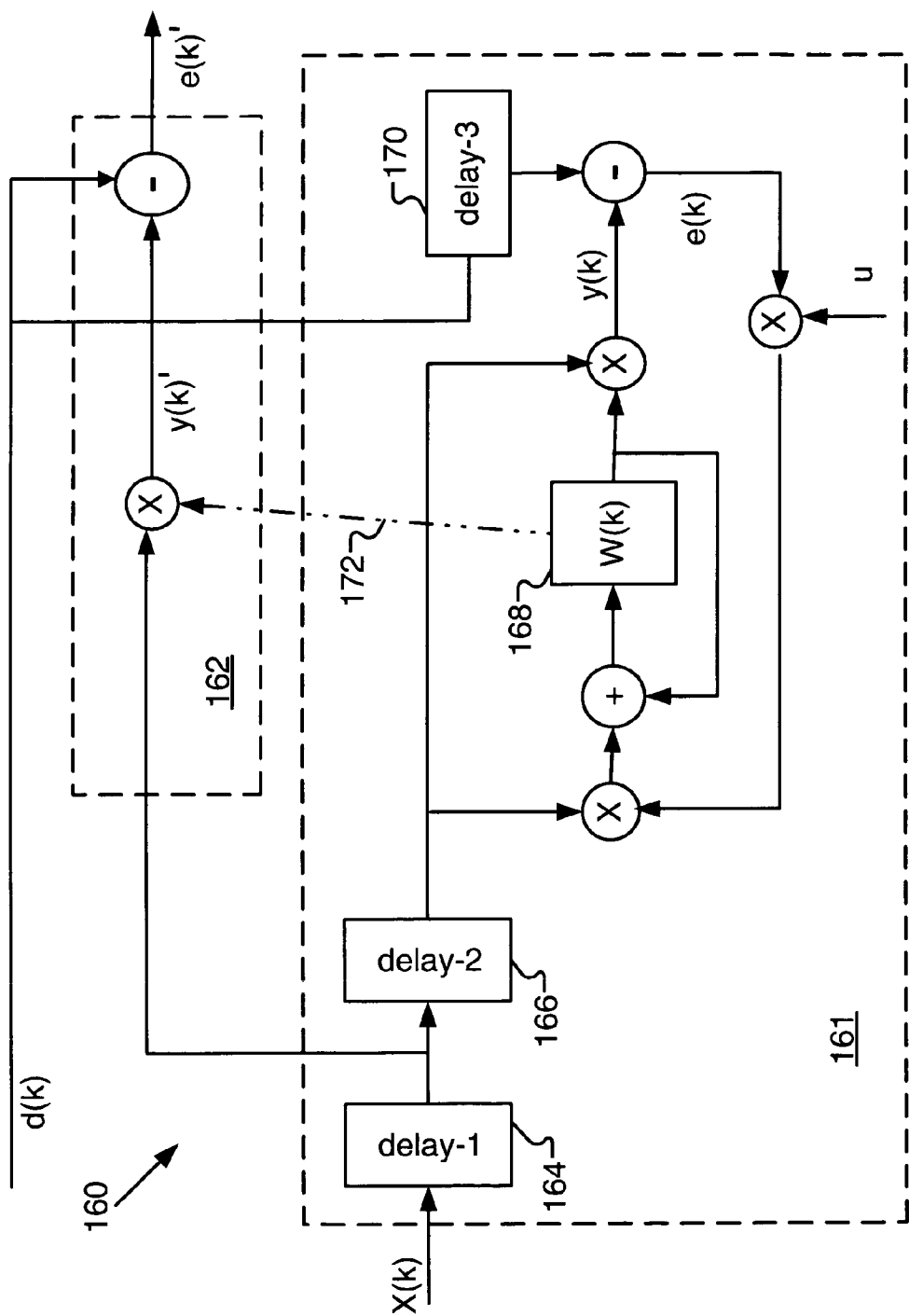
FIG. 3 is a schematic diagram showing one embodiment of an echo canceller of the present invention

FIG. 3 is a schematic diagram showing one embodiment of an echo canceller 160 of the present invention. Echo canceller 160 can be roughly divided into two portions: a portion, shown as a dashed block 161, used to compute the characteristics of an adaptive filter and a portion, shown as a dashed block 162, used to cancel echo. In FIG. 3, the symbol k is used to represent sample numbers. For convenience, sampling is performed periodically. Thus, the time to sample a signal is determined by the product of the symbol k and the sampling period. The sampled data representing signals X(t) and d(t) are presented by X(k) and d(k), respectively. The sampled data X(k) is delayed by a first interval (shown as block 164). This set of data is used to remove echo (as explained in more details later in connection with block 162). Another delay is introduced (shown as block 166). The twice-delayed data is used to compute a set of weights W(k), shown as block 168, that represents the characteristics of the adaptive filter. The sampled data representing received signal, d(k) is delayed once (shown as block 170) in the computation of W(k).

In a preferred embodiment, the delay intervals in blocks 166 and 170 are the same.

The set of formulas for the computation of W(k+1)

$$y(k)=X(k-(m+n))W(k); \quad (1)$$

$$e(k)=d(k-n)-y(k); \quad (2)$$

$$W(k+1)=W(k)+2\mu e(k)X(k-(m+n)); \quad (3)$$

where:
m represents the delay interval of block 164 (i.e., delay-1);
n represents the delay intervals of blocks 166 and 170 (i.e., delay-2 and delay-3); and
m>=n.

In the above equations, the symbol $\mu$ is called the "convergence factor." A large value for $\mu$ leads to faster convergence and a larger asymptotic convergence error. In the present invention, $\mu$ can be in the range of $2^{\wedge}(-9)$ to $2^{\wedge}(-11)$. In FIG. 3, dashed block 161 is used to show the components that are used in the computation.

After n values of W(k) have been computed, they are used to compute the error estimates y(k)' for X(k). These estimates are used to remove echo based on the following set of formulas:

$$y(k)=X(k-m)'W(k); \quad (4)$$

$$e(k)'=d(k)-y(k)'. \quad (5)$$

In FIG. 3, dashed block 162 is used to show the components that are used in the computation. A dashed line 172 connects weights block 168 and the multiplier inside block 162, indicating that n values of the weights W(k) are updated at a time and then used in equations (4) and (5).

An example is used to illustrate the operation of the above equations. Delay-1 is used to set the minimum path length, which is preferably set at 25 ms. For a sample rate of 8 K per second, delay-1 (i.e., m) is 200 samples. In the calculation of the present invention, delay-1 moves the window of operation.

In the preferred embodiment, the maximum value of n is selected to give a total delay of less than 25 ms. In this example, n is selected to be 128, which will lag the coefficient update by 16 ms.

The weights, W(k) are initially set to zero and remain zero until 328 samples of X(k) have been received. The estimates, y(k)', are also set to zero until sample 328. As a result, e(k)' is equal to d(k) for the first 328 samples.

After 328 (i.e., 200+128) samples of X(k) and d(k) have been received, all the delay paths are full and hence processing can begin. The weights, W(k), can be calculated using equation (1)–(3) based on X(k) samples 1 to 128 and d(k) samples 201 to 328. Equation (4) is used to estimate y(k)' for samples 329 to 456 based on X(k) samples 129 to 256. These estimates are then used to cancel the echo on d(k) sample 329 to 456 using equation (5).

The method of the present invention is especially useful when implemented using an FPGA. Because of the relatively limited memory size in current FPGAs, digitized data is preferably stored in a memory chip outside of the FPGAs.

Figure 4:
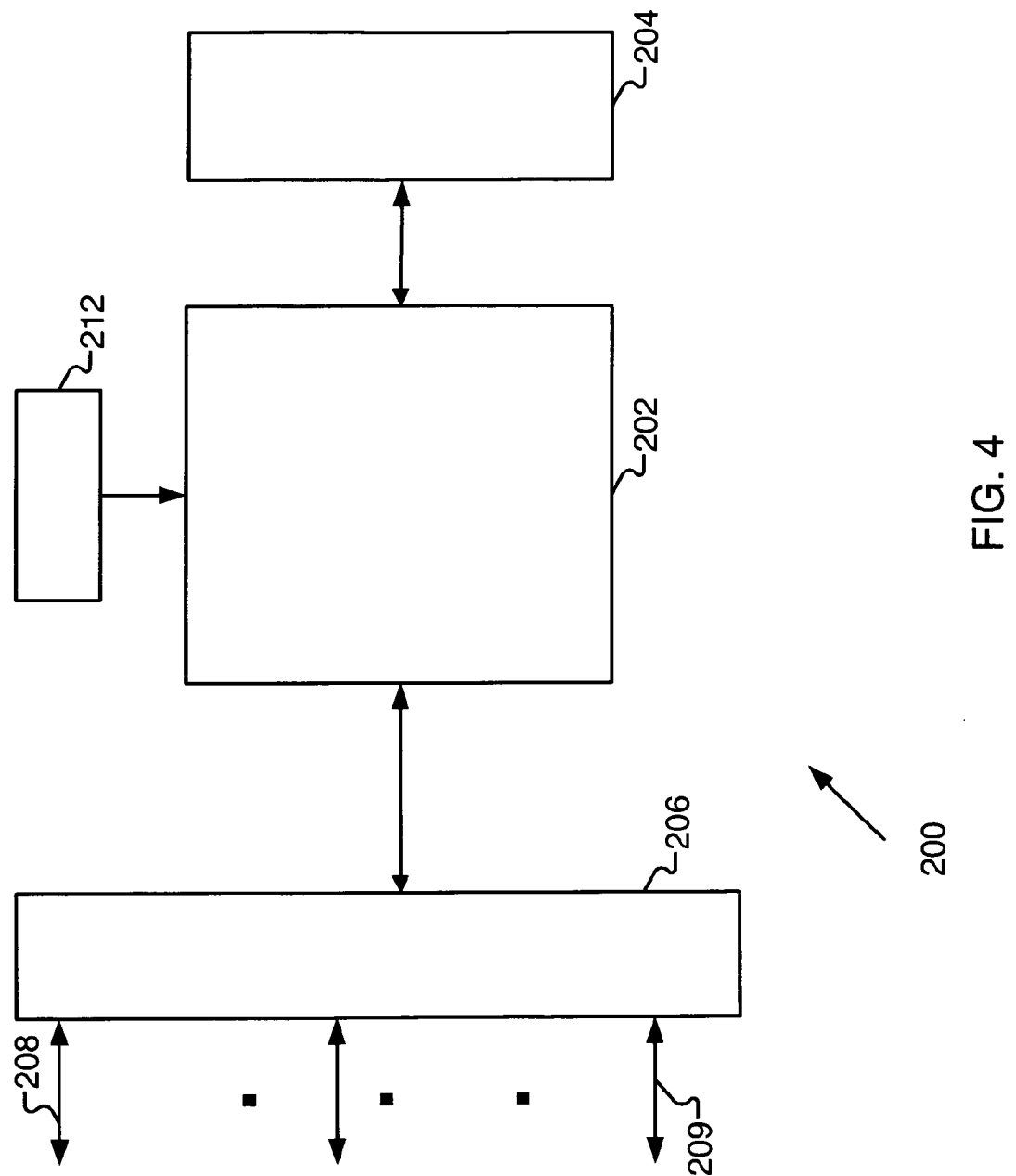
FIG. 4 is a block diagram showing an implementation of the present invention using a FPGA.

FIG. 4 is a block diagram showing an implementation 200 of the present invention using an FPGA 202. An external memory 204 (such as a double data rate dynamic random access memory) is connected to FPGA 202. In a preferred embodiment, only one memory device is used, although the present invention is independent of the number of memory devices. FPGA 202 accepts digital data from a telephonic data source 206. Source 206 accepts many voice channels (such as channels 208 and 209) and combined them into a sequence of data for processing by FPGA 202. Each channel may be similar to the portion of the telephone communication system shown in FIG. 2. Implementation 200 also contains a configuration memory 212 that configures FPGA 202 to perform the algorithm stated in equations 1–5.

Assuming that the FPGA is used to process 1,000 voice channels each has 128 ms of path delay and 8,000 sampling per second, the memory bandwidth requirement can be as high as 24.6 G words/second for a 1,024 tap adaptive filter. The present invention allows 128 or more consecutive samples to be burst processed for the same channel. As a result, the memory bandwidth is greatly reduced.

In one embodiment, the maximum value of n is selected to give a total delay of less than 25 ms. This selection allows compliance with the ITU-T G.168 specification, which states that an echo length of less than 25 ms need not be cancelled. In most applications n=128 is selected. This will lag the coefficient update by 16 ms and mean that the minimum echo path is 16 ms. The memory bandwidth in the system can be reduced by a factor of approximately 100.

The memory size requirement is determined by the length of the adaptive filter (i.e. number of taps). This length is determined by the minimum to maximum echo path that is being cancelled. For an echo path of 25 ms to 150 ms a 1000 tap filter is required. Typically an echo path of 64 ms or 128 ms is chosen, giving filter lengths of 512 taps and 1024 taps respectively.

Memory storage is required for the Tap Coefficients, the transmitted voice data, the received voice data and the echo estimates. The storage (Mem_size) can be calculated by:

Mem_size=channels*(taps+(taps+3n)+2n+2n)=channels*(2*taps+7*n).

Hence as n increases the storage per channel increases by 7n (words).

Assuming taps=512, n=128, channels=1000 and words are 16 bits, the memory size is given by:

Mem_size=1000*(2*512+7*128)*16=30,720,000 MBits of storage.

The memory bandwidth (Mem_bw) is calculated by:

Mem_bw=channels*sample_rate*(2*(taps/n)+((taps/n)+3)+2+2=channels*sample_rate*(3*taps/n+7).

Assuming taps=512, n=128, channels=1000, sample_rate=8000 and memory is word wide, the memory bandwidth is:

Mem_bw=1000*8000*(3*512/128+7)=152,000,000 words per second.

This is significantly less than the 24.6 G words/second bandwidth required by using prior art methods.

It can be seen from the above description that a novel routing method has been disclosed. Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. A method for canceling echo in a telephone communication system, comprising:
    digitizing transmitting signals to generate m+n digitized transmitting data that correspond to a first time period, n and m being predetermined integer numbers and m>=n;
    digitizing receiving signals to generate n digitized receiving data that correspond to a second time period, the second time period being shorter than the first time period and having ending time substantially same as the first time period;
    calculating a set of n weights data using first n digitized transmitting data and the n digitized receiving data; and
    canceling the echo from the receiving signals at a third time period using the set of n weights data, the third time period being following and having substantially same length as the second time period.

2. The method of claim 1 wherein the difference between the first and the second time periods is related to minimum path length.

3. The method of claim 2 wherein the minimum path length is substantially equal to 25 ms.

4. The method of claim 1 wherein the second time period is substantially equal to 16 ms.

5. The method of claim 1 wherein the calculating step comprises:

$$y(k)=X(k-(m+n))W(k);$$

$$e(k)=d(k-n)-y(k);\text{ and}$$

$$W(k+1)=W(k)+2\mu e(k)X(k-(m+n));$$

where:
    k is an integer variable;
    $X(k)$ represents the digitized transmitting data;
    $d(k)$ represents the digitized receiving data;
    $W(k)$ represents the weights data; and
    $\mu$ represents a convergence factor.

6. The method of claim 5 wherein the convergence factor is in the range of $2^{\wedge}(-9)$ and $2^{\wedge}(-11)$.

7. The method of claim 5 wherein the canceling step comprises:

$$y(k)'=X(k-m)'W(k);\text{ and}$$

$$e(k)'=d(k)-y(k)'.$$

8. A circuit for canceling echo in a telephone communication system, said circuit comprising:
    a first delay circuit coupled to receive a transmitting data signal, wherein said first delay circuit generates a delayed transmitting data signal;
    an echo canceller coupled to receive said delayed transmitting data signal from said first delay circuit and a receiving data signal, wherein said echo canceller generates an error corrected signal;
    a second delay circuit coupled to the output of said first delay circuit;
    a third delay circuit coupled to receive said receiving data signal; and
    a circuit for calculating filter weights coupled to receive the output of said second delay circuit and said third delay circuit.

9. The circuit of claim 8 wherein a first delay value m of said first delay circuit is related to minimum path length.

10. The circuit of claim 9 wherein said second delay circuit comprises a second delay value n.

11. The circuit of claim 10 wherein said third delay circuit comprises a third delay value which is approximately equal to said second delay value n.

12. The circuit of claim 11 wherein said circuit for calculating filter weights outputs an error estimate $y(k)$ which is equal to $X(k-(m+n))W(k)$, where k is an integer variable, $X(k)$ represents the transmitting data, and $W(k)$ represents the weights data.

13. The circuit of claim 12 wherein said circuit for calculating filter weights generates updated filter weights $W(k+1)$ which is equal to $W(k)+2\mu e(k)X(k-(m+n))$, where $\mu$ represents a convergence factor and $e(k)$ represents an error corrected signal.

14. The circuit of claim 13 wherein said echo canceller generates an updated error estimate $y(k)'$ equal to $X(k-m)'W(k)$.

15. The circuit of claim 14 wherein said error corrected signal $e(k)'$ generated by said echo canceller equals $d(k)-y(k)'$, where $d(k)$ represents the receiving data.

16. A circuit for canceling echo in a telephone communication system, comprising:
    a telephonic data source outputting data;
    a field programmable gate array coupled to receive data from said telephonic data source, said field programmable gate array comprising:
        a first delay circuit coupled to receive a transmitting data signal, wherein said first delay circuit generates a delayed transmitting data signal;
        an echo canceller coupled to receive said delayed transmitting data signal from said first delay circuit and a receiving data signal, wherein said echo canceller generates an error corrected signal;
        a second delay circuit coupled to the output of said first delay circuit;
        a third delay circuit coupled to receive said receiving data signal; and
        a circuit for calculating filter weights coupled to receive the output of said second delay circuit and said third delay circuit.

17. The circuit of claim 16 wherein a first delay value m of said first delay circuit is related to minimum path length, and wherein said second delay circuit and said third delay circuit comprise a second delay value n.

18. The circuit of claim 17 wherein said circuit for calculating filter weights outputs an error estimate $y(k)$ which is equal to $X(k-(m+n))W(k)$, where k is an integer variable, $X(k)$ represents the transmitting data, and $W(k)$ represents the weights data.

19. The circuit of claim 18 wherein said circuit for calculating filter weights generates updated filter weights $W(k+1)$ which is equal to $W(k)+2\mu e(k)X(k-(m+n))$, where $\mu$ represents a convergence factor and $e(k)$ represents an error corrected signal.

20. The circuit of claim 19 wherein said echo canceller generates an updated error estimate $y(k)'$ equal to $X(k-m)'W(k)$, and wherein said error corrected signal $e(k)'$ generated by said echo canceller equals $d(k)-y(k)'$, where $d(k)$ represents the receiving data.

* * * * *